United States Patent
Aoki (10) Patent No.: US 9,067,518 B2
(45) Date of Patent: Jun. 30, 2015

(54) HEATING SYSTEM

(75) Inventor: Hiroshi Aoki, Tokyo (JP)

(73) Assignee: Takata Corporation, Tokyo (JP)

( * ) Notice: Subject to any disclaimer, the term of this patent is extended or adjusted under 35 U.S.C. 154(b) by 181 days.

(21) Appl. No.: 13/814,480

(22) PCT Filed: Jul. 27, 2011

(86) PCT No.: PCT/JP2011/067169
§ 371 (c)(1),
(2), (4) Date: Feb. 5, 2013

(87) PCT Pub. No.: WO2012/017902
PCT Pub. Date: Feb. 9, 2012

(65) Prior Publication Data
US 2013/0134745 A1 May 30, 2013

(30) Foreign Application Priority Data

Aug. 5, 2010 (JP) .................. 2010-176823

(51) Int. Cl.
*B60L 1/02* (2006.01)
*B60N 2/56* (2006.01)
*B60N 2/00* (2006.01)
*G01R 27/26* (2006.01)

(52) U.S. Cl.
CPC .............. *B60N 2/5685* (2013.01); *B60N 2/002* (2013.01)

(58) Field of Classification Search
USPC .................. 219/202, 200, 217, 212, 552–553, 219/528–529, 201, 496; 324/686
See application file for complete search history.

(56) References Cited

U.S. PATENT DOCUMENTS

2004/0113634 A1 * 6/2004 Stanley et al. ................ 324/661

FOREIGN PATENT DOCUMENTS

| DE | 10311132 A1 | | 9/2004 |
|---|---|---|---|
| JP | 10-199661 A | | 7/1998 |
| JP | 2003-231411 A | | 8/2003 |
| JP | 2004-504082 A | | 2/2004 |
| JP | 2005-172839 A | | 6/2005 |
| JP | 2008-024087 | * | 2/2008 |
| JP | 2008-024087 A | | 2/2008 |
| JP | 2008-191110 A | | 8/2008 |
| JP | 2010-070086 A | | 4/2010 |
| JP | 2010-073530 A | | 4/2010 |
| WO | 2002/06083 A1 | | 1/2002 |
| WO | 2009/095340 A1 | | 8/2009 |

OTHER PUBLICATIONS

International Search Report from the International Bureau of WIPO for International Application No. PCT/JP2011/067169 dated Oct. 25, 2011 and English translation of the same (4 pages).

* cited by examiner

*Primary Examiner* — Shawntina Fuqua
(74) *Attorney, Agent, or Firm* — Fitch Even Tabin & Flannery LLP (57) ABSTRACT

A seat heater has heater electrodes in a film shape and a sensor electrode in a film shape. When detecting an occupant through the sensor electrode, the heater electrodes are disconnected from a heater unit to cause those electrodes to be substantially insulated from a vehicle. This makes it possible to detect the occupant seated on a seat without being affected by the heater electrodes. According to such a structure, it becomes possible to warm the occupant and to precisely detect the occupant.

11 Claims, 11 Drawing Sheets

MEASUREMENT RESULT

HEATING SYSTEM

CROSS-REFERENCE TO RELATED APPLICATIONS

This application is a U.S. national phase application filed under 35 U.S.C. §371 of International Application PCT/JP2011/067169, filed on Jul. 27, 2011, designating the United States, which claims priority from Japanese Application 2010-176823, filed Aug. 5, 2010, which are hereby incorporated herein by reference in their entirety.

FIELD OF THE INVENTION

The present invention relates to a heating system, and more particularly, to a heating system for warming an occupant.

BACKGROUND OF THE INVENTION

Occupant restraining systems represented by seat belts and air-bag systems have become smaller and of lower cost, and are nowadays installed in almost all kinds of vehicles as standard equipment. This kind of occupant restraining system should be able to detect the occupant of a seat with accuracy for urging him/her to wear the seat belt or for controlling the air-bag according to the presence/absence of the occupant.

On the other hand, vehicles used in cold climates sometimes have a heating element installed in the seats for warming the occupants. The seats of vehicles generally have a seat surface made of a low heat conductive material such as urethane foam. Therefore, for warming the occupant efficiently, the heating element should be placed near the seat surface.

Then, a two-tier structure unit formed by laminating a heating element film and a sensor film has been proposed (for example, see Japanese National Patent Publication No. 2004-504082).

SUMMARY OF THE INVENTION

When, however, a heater for warming an occupant is disposed in a seat together with a sensor electrode, the sensor electrode is electrically connected to the heater, and the capacitance between the sensor electrode and the heater may become remarkably larger than the capacitance between an occupant as a detection target and the sensor electrode. In this case, the change in the capacitance changing depending on the presence/absence of the sitting occupant becomes remarkably smaller than the capacitance between the sensor electrode and the ground, and thus the detection precision of an occupant seated on the seat may decrease.

In consideration of the foregoing, it is an objective of the present invention to improve the detection precision of an occupant.

In order to achieve the above objective, a heating system of the present invention is:

a heating system for warming an occupant seated on a seat of a vehicle, the heating system comprising:

a heating element disposed in the seat;
heater electrodes connected to the heating element;
a sensor electrode disposed in the seat;
supply means for supplying power to the heating element;
connection means for intermittently connecting the supply means with the heater electrodes;
measurement means for measuring an impedance between the sensor electrode and the vehicle when the supply means is not connected to the heater electrode; and
detection means for detecting the occupant seated on the seat based on the impedance measured by the measurement means.

The heater electrodes may overlap the heating element or the heater electrodes.

The measurement means may measure, as an impedance correlation value, capacitance between the sensor electrode and the vehicle from an AC voltage applied between the sensor electrode and the vehicle and a current or a voltage input into the sensor electrode in accordance with a change in the impedance.

The measurement means may measure, as the capacitance that is the impedance correlation value, a quadrature component of the current to the AC voltage.

The measurement means may measure an in-phase component of the current to the AC voltage, and the detection means may detect the occupant seated on the seat based on a comparison result between a threshold defined based on a relationship between the in-phase component and the quadrature component and the capacitance.

The heating system may further have a temperature detecting sensor that detects a temperature of the seat near the heating element, in which the detection means may detect the occupant based on a temperature of the seat detected by the temperature detecting sensor and a comparison result between the threshold and the capacitance.

The connection means may alternately connect the heater electrodes with the supply means and a power source that applies a voltage to the heater electrodes.

The power source may apply a voltage with a same phase as a phase of a voltage applied to the sensor electrode.

The power source may apply a voltage with a different phase from a phase of a voltage applied to the sensor electrode.

According to the present invention, the electrode of the heater for warming an occupant can be disconnected from the power source when an occupant is detected. Accordingly, the heater electrode and the heating element are insulated from the ground, and thus the occupant can be detected precisely without being affected by the heater electrode or the like.

DETAILED DESCRIPTION OF THE PREFERRED EMBODIMENTS

Embodiment 1

Figure 1:
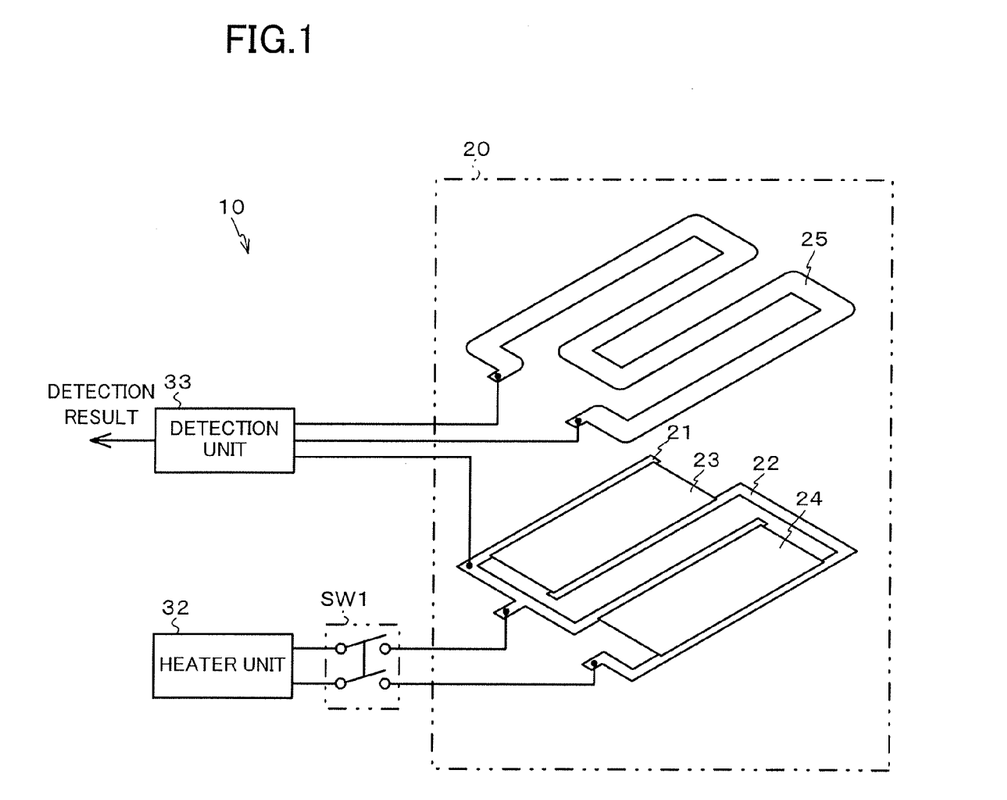
FIG. 1 is a block diagram of the heating system according to Embodiment 1.

Embodiment 1 of the present invention will be described hereafter with reference to the drawings. FIG. 1 is a diagram illustrating a general structure of a heating system 10 according to the present embodiment. The heating system 10 is a system for warming an occupant seated on, for example, a seat of a vehicle. As shown in FIG. 1, this heating system 10 has a seat heater 20, a heater unit 32, a detection unit 33, and a switch SW1.

Figure 2:
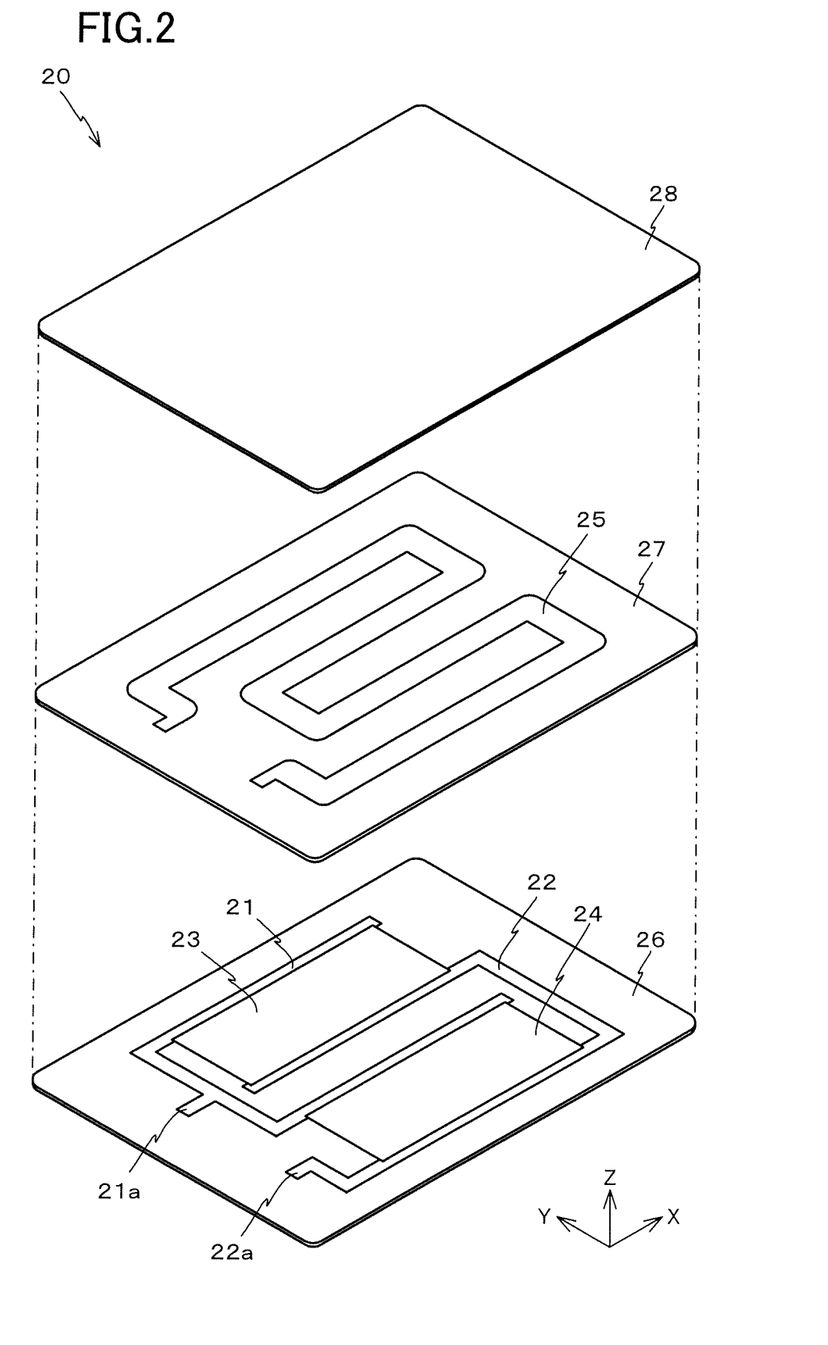
FIG. 2 is an exploded perspective view of a seat heater.

FIG. 2 is an exploded perspective view of the seat heater 20. As shown in FIG. 2, the seat heater 20 has a sensor electrode 25, two heater electrodes 21 and 22, heating elements 23 and 24 formed between the heater electrode 21 and the heater electrode 22, and insulation sheets 26, 27, and 28 covering the respective members.

The insulation sheets 26, 27, and 28 are each, for example, a sheet formed of a PET (polyethylene tephthalate), or a Mylar film. Moreover, the insulation sheets 26, 27, and 28 which are a sheet formed of a material with flexibility like polyimide, polyvinyl chloride, or a silicon rubber can be applied. Those insulation sheets 26, 27, and 28 are shaped into a rectangle having a lengthwise direction in a Y-axis direction.

The heater electrode 21 is formed on a top face of the insulation sheet 26. As shown in FIG. 2, the heater electrode 21 is formed of a silver paste or copper and is patterned into a U shape. The heater electrode 21 has a connection part 21a formed at a −X side thereof and connected to the switch SW1.

The heater electrode 22 is shaped into a U shape like the heater electrode 21, and has a connection part 22a formed at a −X side thereof and connected to the switch SW1. The pattern of this heater electrode 22 at a +Y side is surrounded by the heater electrode 21.

Those heater electrodes 21 and 22 can be formed on the top face of the insulation seat 26 by bonding a copper foil on the top face of the insulation sheet 26, and by etching and patterning such a copper foil.

Figure 3:
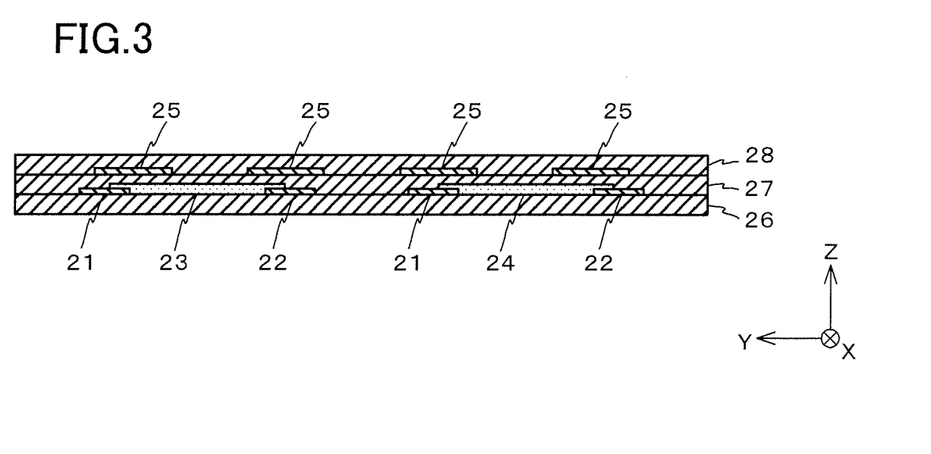
FIG. 3 is a cross-sectional view of the seat heater.

The heating elements 23 and 24 are each shaped into a rectangle having the lengthwise direction in an X-axis direction, and are formed in such a manner as to adjoin with each other in the Y-axis direction. As shown in FIG. 3, the heating elements 23 and 24 are each formed between the top face of the heater electrode 21 and the top face of the heater electrode 22.

Those heating elements 23 and 24 can be formed on the top face of the insulation sheet 26 by applying a temperature-resistance paste or a carbon paste from the heater electrode 21 to the heater electrode 22 on the top face of the insulation sheet 26 where the heater electrodes 21 and 22 are formed and by letting such a paste to be cured.

The sensor electrode 25 is formed in such a manner as to run on the top face of the insulation sheet 27 in a zig-zag manner. The sensor electrode 25 is also formed of copper like the heater electrodes 21 and 22. This sensor electrode 25 can be formed by, for example, bonding a copper foil on the top face of the insulation sheet 27, and by etching and patterning this copper foil.

As is clear from FIG. 2, the insulation sheets 26 to 28 constructing the seat heater 20 are integrated with each other by bonding the insulation sheet 27 formed with the sensor electrode 25 on the top face of the insulation sheet 26 formed with the heater electrodes 21 and 22, and by bonding the insulation sheet 28 on the top face of the insulation sheet 27.

FIG. 3 is a diagram illustrating a ZY cross-section of the seat heater 20. As shown in FIG. 3, the heater electrodes 21 and 22, the heating elements 23 and 24, and the sensor electrode 25 are insulated by the insulation sheet 27. Moreover, the heater electrodes 21 and 22 and the heating elements 23 and 24 are covered by the insulation sheet 26, and the sensor electrode 25 is covered by the insulation sheet 28.

Figure 4:
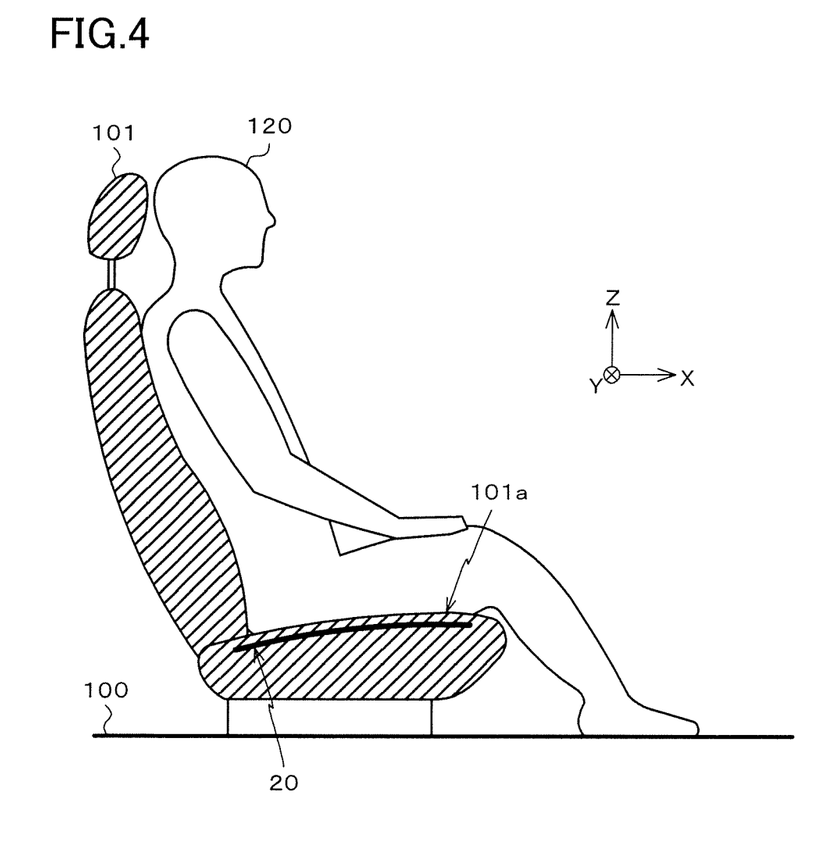
FIG. 4 is an illustration showing a vehicle seat and the occupant seated on the seat.

FIG. 4 is a diagram illustrating a seat 101 of a vehicle 100 together with an occupant 120 seated on the seat 101. As shown in FIG. 4, the seat heater 20 employing the above-explained structure is disposed right below the seat cover forming a seating surface 101a of the seat 101.

Returning to FIG. 1, the heater unit 32 is connected to the heater electrodes 21 and 22 through the switch SW1. This heater unit 32 supplies electrical energy from an unillustrated battery loaded on the vehicle 100 to the heating elements 23 and 24 through the heater electrodes 21 and 22. Accordingly, current flows through the heating elements 23 and 24, and thus the heating elements 23 and 24 generate heat.

The switch SW1 intermittently disconnects the heater unit 32 with the heater electrodes 21 and 22. When the heater unit 32 is disconnected from the heater electrodes 21 and 22, the heater electrodes 21 and 22 and the heating elements 23 and 24 are electrically insulated from the vehicle 100.

The detection unit 33 monitors the potential of the heater electrode 21, and obtains the capacitance between the sensor electrode 25 and the vehicle 100 when the heater unit 32 is disconnected from the heater electrodes 21 and 22 by the switch SW1, and determines whether or not the occupant 120 is seated on the seat 101 based on the obtained capacitance. Next, the detection unit 33 outputs the determination result to, for example, an external device.

Figure 5:
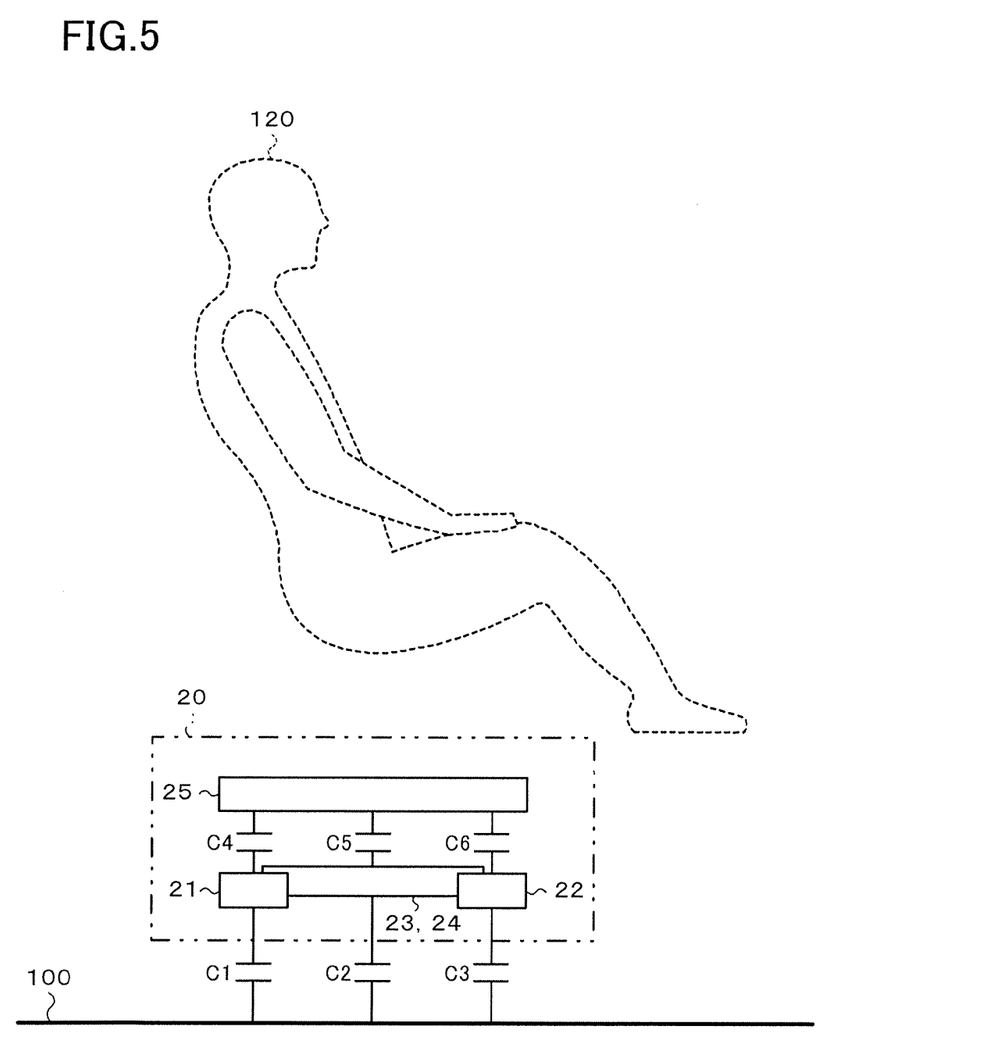
FIG. 5 is a diagram schematically showing the electric circuit formed when there is no occupant seated on the seat.

FIG. 5 is a diagram schematically showing an electric circuit formed when no occupant 120 is seated on the seat 101. In the electric circuit formed when no occupant is seated on the seat 101, as shown in FIG. 5, the sensor electrode 25 is connected to the heater electrodes 21 and 22 through capacitors C4 and C6, and is connected to the heating elements 23 and 24 through a capacitor C5. The heater electrodes 21 and 22 are connected to the vehicle 100 through capacitors C1 and C3. Moreover, the heating elements 23 and 24 are connected to the vehicle 100 through a capacitor C2.

Figure 6:
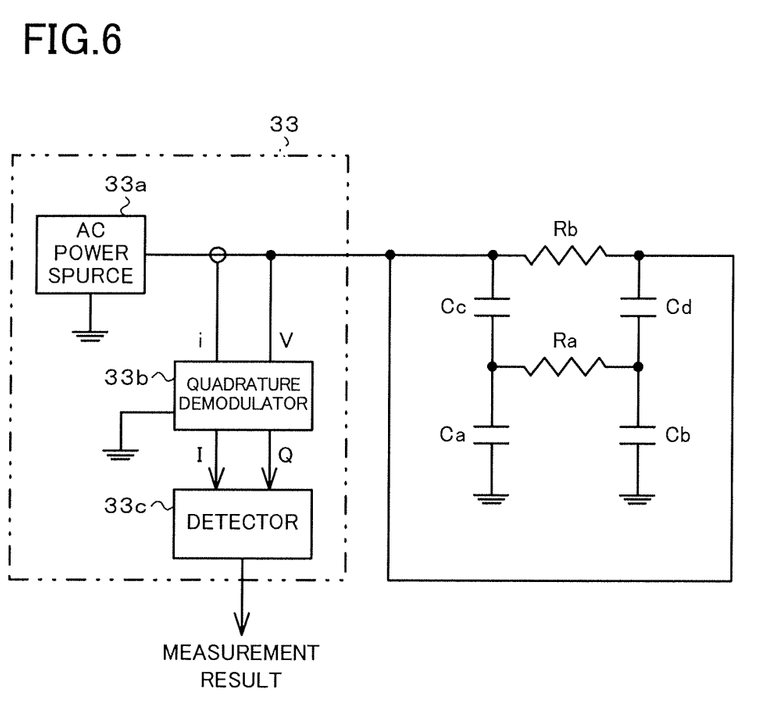
FIG. 6 is a diagram showing an equivalent circuit to the electric circuit in FIG. 5.

FIG. 6 is an equivalent circuit of the circuit shown in FIG. 5. The circuit shown in FIG. 5 can be substituted by the equivalent circuit shown in FIG. 6. A resistor Ra configuring the equivalent circuit of FIG. 6 indicates resistance or the like between the heater electrode 21 and the heater electrode 22. A resistor Rb indicates resistance of the sensor electrode 25. Furthermore, capacitors Ca and Cb are composite of capacitors C1, C2 and C3. Capacitors Cc and Cd are composite of capacitors C4, C5, and C6.

As is clear from the equivalent circuit shown in FIG. 6, composite capacitance $C_{T1}$ between the sensor electrode 25 and the vehicle 100 are defined by capacitors Ca, Cb, Cc, and Cd.

Figure 7:
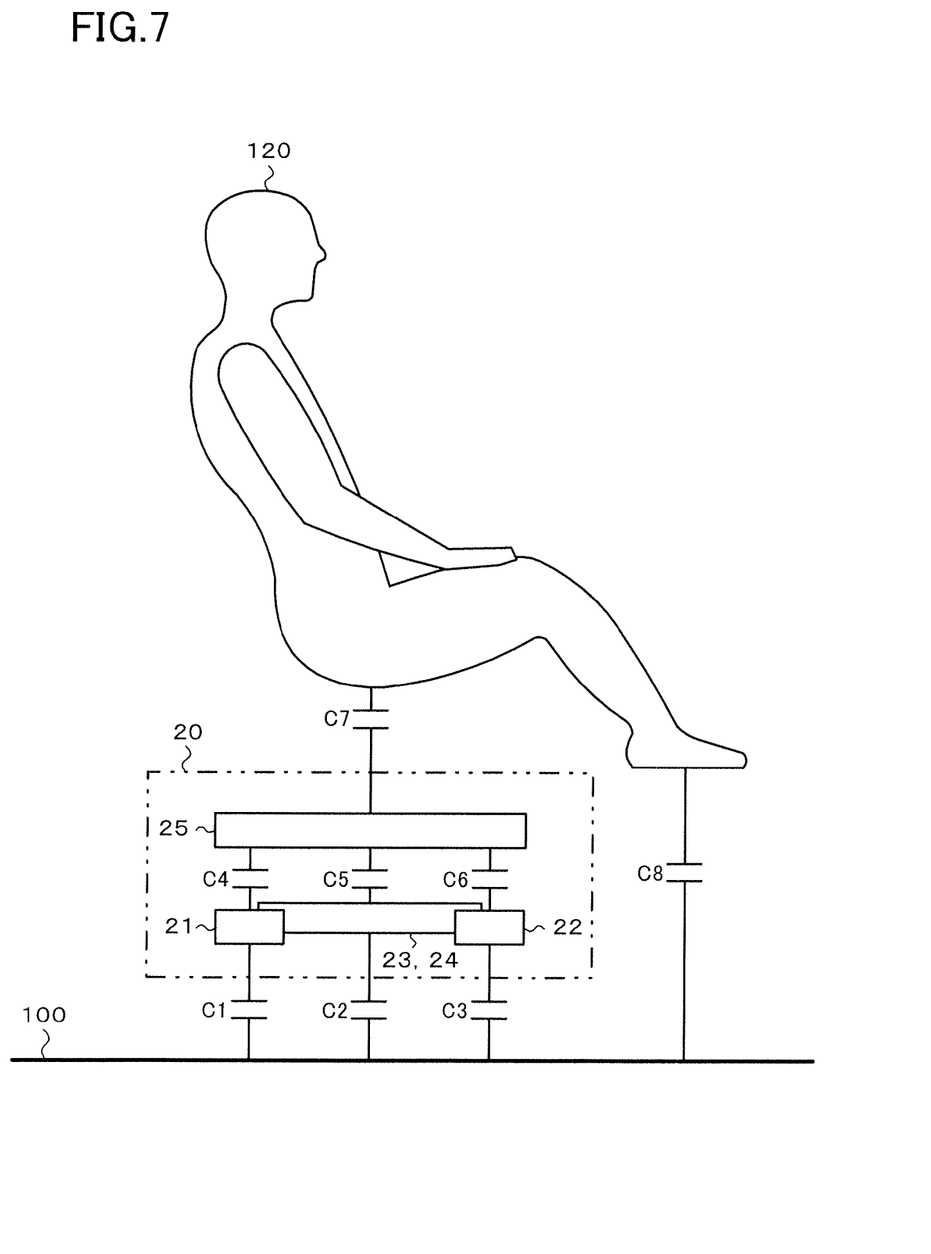
FIG. 7 is a diagram schematically showing the electric circuit formed when there is an occupant seated on the seat.

FIG. 7 is a diagram schematically showing an electric circuit formed when the occupant 120 is seated on the seat 101. As is clear when FIG. 7 is compared with FIG. 5, when the occupant 120 sits down the seat 101, a new circuit having the occupant 120 present therein is formed. The newly formed circuit has a capacitor C7 indicating capacitance between the sensor electrode 25 and the occupant 120, and a capacitor C8 indicating capacitance between the occupant 120 and the vehicle 100.

Figure 8:
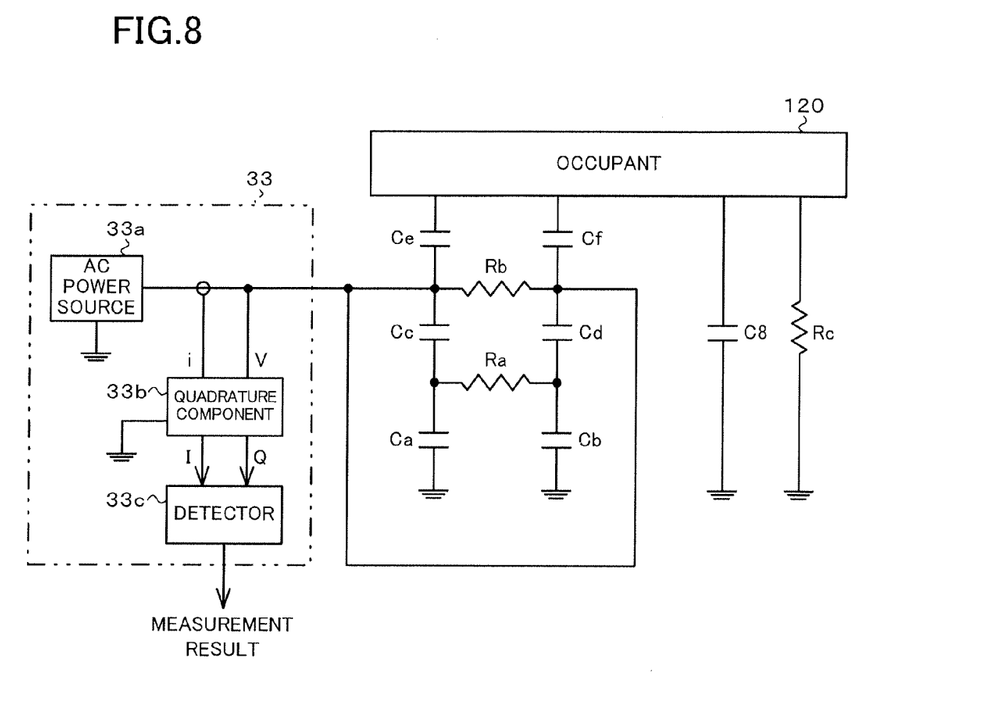
FIG. 8 is a diagram showing an equivalent circuit to the electric circuit in FIG. 7.

The circuit shown in FIG. 7 can be substituted by an equivalent circuit shown in FIG. 8. The equivalent circuit shown in FIG. 8 is the equivalent circuit of FIG. 6 which is further added with capacitors Ce, Cf, and C8 and a resistor Rc. The capacitors Ce and Cf are capacitors having capacitance that is a half of the capacitance of the capacitor C7. Moreover, the capacitor C8 is, as explained above, a capacitor indicating capacitance between the occupant 120 and the vehicle 100. Furthermore, the resistor Rc indicates resistance between the occupant 120 and the vehicle 100.

As is clear from the equivalent circuit of FIG. 8, composite capacitance $C_{T2}$ between the sensor electrode 25 and the vehicle 100 when the occupant 120 is seated on the seat 101 can be measured through the following formula (1).

$$C_{T2} = C_{T1} + C8 \cdot (Ce + Cf)/(Ce + Cf + C8) \quad (1)$$

As is clear from the above formula (1), when the occupant 120 sits down the seat 101, the value of the composite capacitance between the sensor electrode 25 and the vehicle 100 increases by what corresponds to the capacitance inherent to the capacitors Ce, Cf, and C8. The detection unit 33 detects the composite capacitance changing as explained above, and determines whether or not the occupant 120 is seated on the seat 101 based on the detection result. The specific structure of the detection unit 33 will be explained below.

As shown in FIG. 8, the detection unit 33 has an AC power source 33a, a quadrature demodulator 33b, and a detector 33c.

The AC power source 33a converts the voltage of an unillustrated battery installed on the vehicle 100 into an AC voltage of substantially 100 kHz, and applies such a voltage between the sensor electrode 25 and the body of the vehicle 100.

The quadrature demodulator 33b monitors an AC voltage V applied between the sensor electrode 25 and the vehicle 100 and current i supplied to the sensor electrode 25. Next, the quadrature demodulator 33b outputs information on the in-phase component I of the current i to the AC voltage V and the quadrature component Q of the current i to the AC voltage V to the detector 33c.

The detector 33c determines whether or not the occupant 120 is seated on the seat 101 based on the value of the in-phase component I and that of the quadrature component Q. Next, the detector 33c outputs a determination result to, for example, an external device.

Figure 9:
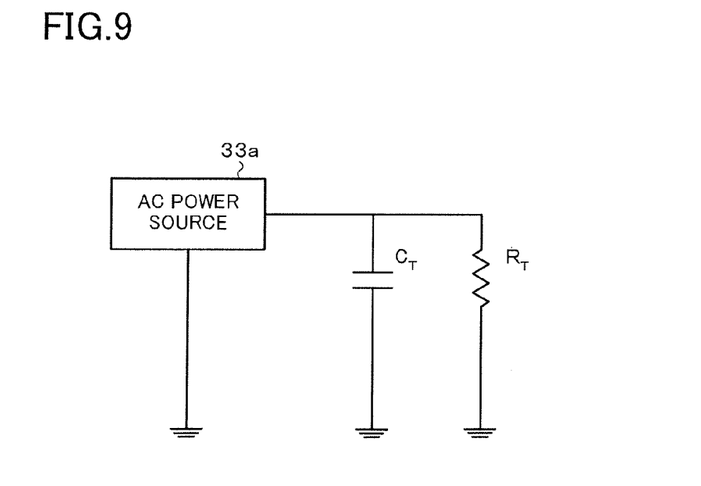
FIG. 9 is a diagram showing an equivalent circuit to the electric circuit in FIG. 8.

Electric circuits shown in FIG. 6 and FIG. 8 can be regarded as a circuit shown in FIG. 9. In this case, composite resistance $R_T$ and composite capacitance $C_r$ between the sensor electrode 25 and the vehicle 100 can be expressed as following formulae (2) and (3), respectively. According to the following formula (2), it becomes clear that the composite capacitance $C_T$ is equivalent to the quadrature component Q of the current i.

$$C_T = Q \quad (2)$$

$$R_T = 1/I \quad (3)$$

Hence, the detector 33c compares, for example, the value of the quadrature component Q with a predetermined threshold value. Next, when the quadrature component Q is equal to or larger than the threshold value, the detector 33c determines that the occupant 120 is seated on the seat 101. Conversely, when the quadrature component Q is smaller than the predetermined threshold value, the detector 33c determines that no occupant 120 is seated on the seat 101.

According to the present embodiment, when the seating surface 101a of the seat 101 is wet or when the material of the seat 101 is moist, the above-explained threshold is set in consideration of the increase of the capacitance between the sensor electrode 25 and the vehicle 100. To set such a threshold, a straight line indicating an IQ characteristic shown in FIG. 10 is utilized.

Figure 10:
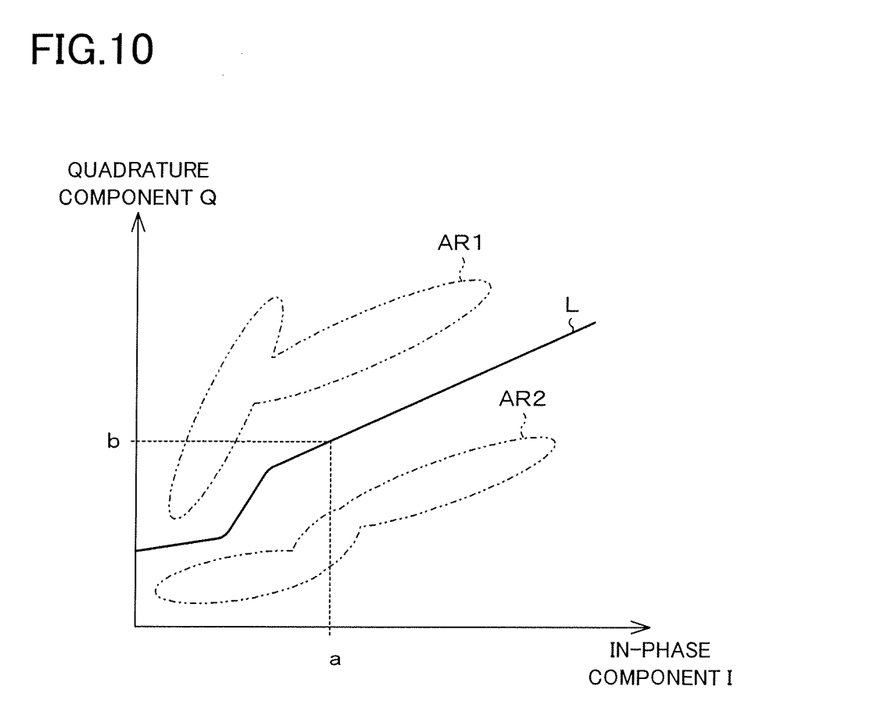
FIG. 10 is a graphical representation showing a relationship between the quadrature component and the in-phase component.

An area AR1 in FIG. 10 is an area where the points defined by the quadrature component Q and in-phase component I are present when the occupant 120 is seated on the seat 101. On the other hand, an area AR2 is an area where the points defined by the quadrature component Q and in-phase component I are present when the occupant 120 is not seated on the seat 101. The detector 33c determines the threshold based on a curve L separating the areas AR1 and AR2. For example, the detector 33c determines that the threshold is b when the in-phase component I has a value a.

Then, the detector 33c determines that the occupant 120 is seated on the seat 101 when the quadrature component Q has a value greater than the threshold b. On the other hand, the detector 33c determines that the occupant 120 is not seated on the seat 101 when the quadrature component Q has a value smaller than the threshold b. Then, the detector 33c outputs information regarding the above determination result to, for example, an external device.

The external device can use the determination result, for example, for giving a warning to wear the seatbelt or for controlling the expansion of the air-bag.

As explained above, the seat heater 20 of the present embodiment has the heater electrodes 21 and 22 in the film shape, and the sensor electrode 25 in the film shape. When detecting the occupant 120 through the sensor electrode 25, the heater electrodes 21 and 22 are disconnected from the heater unit 32, and are substantially insulated from the vehicle 100. Hence, when detecting the occupant 120, the detection unit 33 can detect the occupant 120 without being affected by the heater electrodes 21 and 22. This operation will be explained below in more detail.

As shown in FIG. 3, the sensor electrode 25 and the heater electrodes 21 and 22 are distant from each other by what corresponds to the thickness of the insulation sheet 27, the capacitances of the capacitors Cc and Cd shown in, for example, FIG. 6 or FIG. 8 become large. According to the present embodiment, when detecting the occupant 120, the heater electrodes 21 and 22 are disconnected from the heater unit 32. Hence, the capacitances of the capacitors Ca and Cb shown in, for example, FIG. 8 become relatively small in comparison with the capacitances of the capacitors Cc and Cd. Moreover, the capacitance $C_{T1}$ between the sensor electrode 25 and the vehicle 100 when no occupant 120 is seated on the seat 101 becomes a relatively small value. Accordingly, as is clear from formula (1), a difference (=C8·(Ce+Cf)/(Ce+Cf+C8)) between the capacitance $C_{T2}$ when the occupant 120 is seated on the seat 101 and the capacitance $C_{T1}$, when no occupant 120 is seated on the seat 101 becomes large in comparison with the capacitance $C_{T1}$. Hence, the detection unit 33 can detect the occupant 120 which is hardly affected by the heater electrodes 21 and 22.

When the heater electrodes 21 and 22 are connected with the heater unit 32, the heater electrodes 21 and 22 may be grounded to the vehicle 100 through the heater unit 32. In this case, the capacitance between the heater electrodes 21, 22 and the vehicle 100 or between the heater electrode 21 and the sensor electrode 25 becomes large. In this case, also, the occupant 120 seated on the seat 101 can be detected upon consideration of the capacitance between the heater electrodes 21, 22 and the occupant 120 and the capacitance between the heater electrodes 21, 22 and the sensor electrode 25, and the like.

According to the present embodiment, the detection unit 33 monitors the potential of the heater electrode 22, thereby determining whether or not the heater unit 32 is disconnected from the heater electrodes 21 and 22. The present invention is not limited to such a configuration, and the detection unit 33 may determine whether or not the heater unit 32 is disconnected from the heater electrodes 21 and 22 by monitoring the condition of the switch SW1.

Moreover, according to the present embodiment, the detection unit 33 monitors the potential of the heater electrode 21, thereby determining whether or not the heater unit 32 is disconnected from the heater electrodes 21, 22. The present invention is not limited to this configuration, and the switch SW1 may be operated to disconnect the heater unit 32 from the heater electrodes 21 and 22 when the detection unit 33 attempts to detect the occupant 120.

Furthermore, according to the present embodiment, the threshold for a determination on whether or not the occupant 120 is seated on the seat 101 is set based on the value of the in-phase component I output by the quadrature demodulator 33b. The above-explained determination is carried out based on such a threshold. Hence, the occupant 120 can be precisely detected.

According to the present embodiment, the explanation was given of the case in which the seat heater 20 has the heater electrodes 21 and 22 of the dual system. The present invention is not limited to this configuration, and the seat heater 20 may have heater electrodes of equal to or greater than a triple system.

According to the present embodiment, both heater electrode 21 and heater electrode 22 are disconnected from the heater unit 32 by the switch SW1. The present invention is not limited to this case, and only either one of the heater electrode 21 and the heater electrode 22 may be disconnected. When the seat heater 20 has the heater electrodes of equal to or greater than the triple system, only some heater electrodes may be disconnected from the heater unit 32.

When detecting the occupant 120, it is appropriate if the heater electrodes 21 and 22 are disconnected from the heater unit 32 for substantially 0.1 second. Hence, the function of warming up the occupant 120 is not disturbed.

Embodiment 2

The heating system according to Embodiment 2 of the present invention will be described hereafter. A heating system 10A of the present embodiment differs from the first embodiment that such a heating system applies an AC voltage to both sensor electrode 25 and heater electrodes 21 and 22 when attempting to detect the occupant 120.

Figure 11:
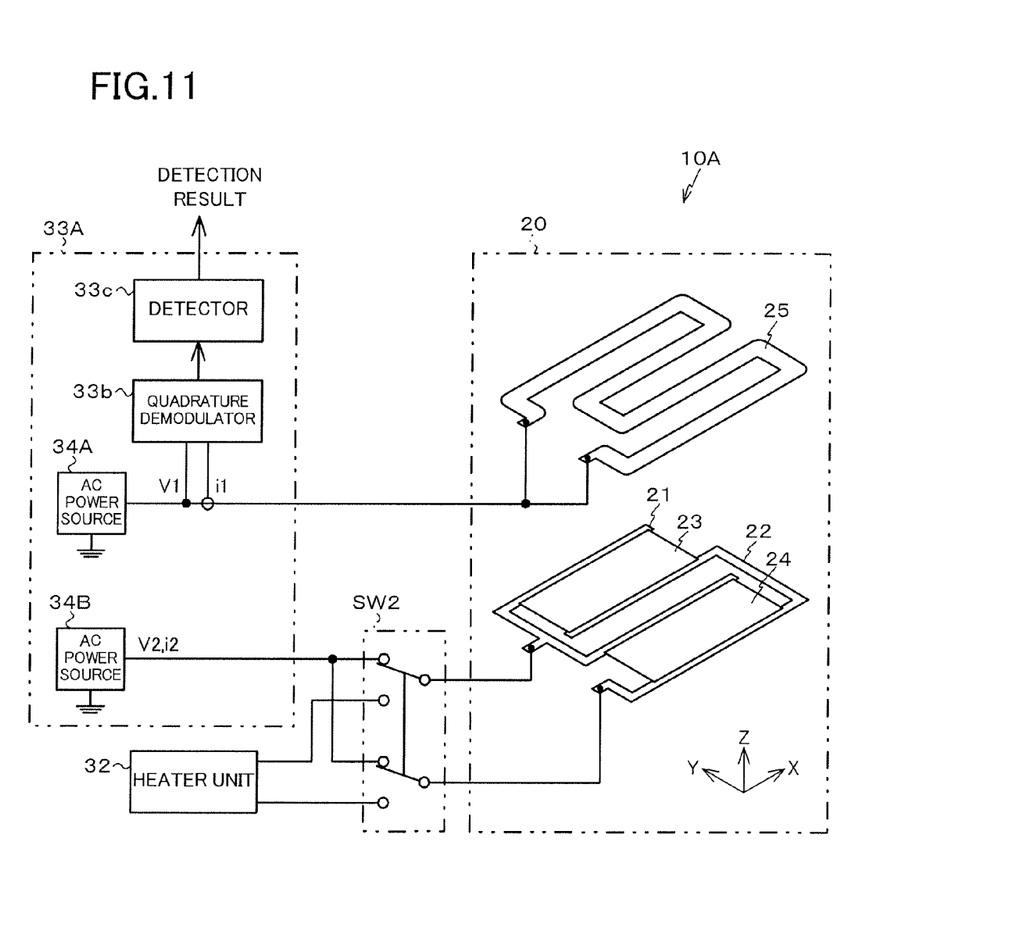
FIG. 11 is a block diagram of the heating system according to Embodiment 2.

FIG. 11 is a block diagram of the heating system 10A of the present embodiment. As shown in FIG. 11, the heating system 10A has a switch SW2 and a detection unit 33A.

The switch SW2 alternately connects the heater electrodes 21 and 22 of the seat heater 20 with the heater unit 32 and the detection unit 33A, respectively.

The detection unit 33A constructing the heating system 10A has AC power sources 34A, 34B, the quadrature demodulator 33b, and the detector 33c.

The AC power source 34A applies an AC voltage V1 with an amplitude of v to both terminals of the sensor electrode 25. Moreover, the AC power source 34B applies an AC voltage V2 with an amplitude of v having a different cycle 180 degrees from the AC voltage V1 to the heater electrodes 21 and 22 when the heater electrodes 21 and 22 are connected to the detection unit 33A by the switch SW2.

Figure 12:
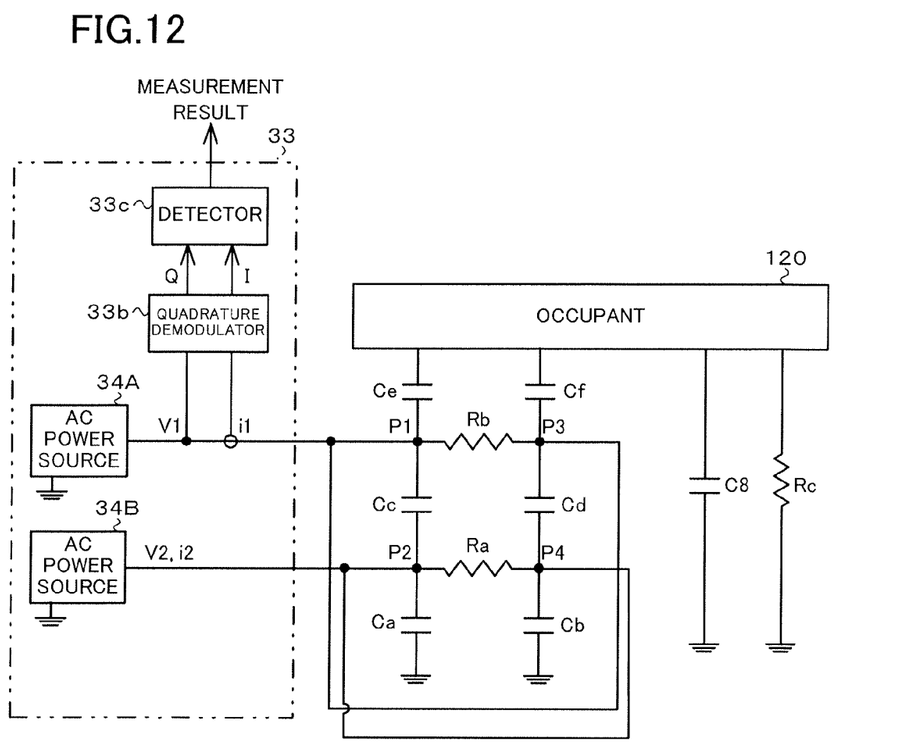
FIG. 12 is a diagram showing an equivalent circuit to the electric circuit in FIG. 11.

FIG. 12 is, for example, an equivalent circuit of a circuit formed when the heater electrodes 21 and 22 are connected to the detection unit 33A by the switch SW2. According to the present embodiment, the AC voltages applied by the AC power sources 34A and 34B have different phases 180 degrees from each other. Hence, a potential difference between a point P1 and a point P2 at both terminals of the capacitor Cc in FIG. 12 and a potential difference between a point P3 and a point P4 at both terminals of the capacitor Cd become 2v at maximum.

Hence, a value of current i1 supplied from the AC power source 34A to the sensor electrode 25 becomes large. Accordingly, the value of the in-phase component I of the current i1 to the AC voltage V1 output by the quadrature demodulator 33b and that of the quadrature component Q become relatively large.

Moreover, since the potential difference between the capacitor Cc and the capacitor Cd becomes large, a current component originating from the capacitors Cc and Cd among in the current of the capacitance between the sensor electrode 25 and the vehicle 100 becomes dominant. In this case, a change in the capacitances of the capacitors Cc and Cd can be detected by detecting a change in the quadrature component Q.

For example, the insulation sheet 27 present between the above-explained sensor electrode 25 and the above-explained heater electrodes 21 and 22 is compressed and deformed in accordance with the weight of the occupant 120 seated on the seat 101. Hence, by detecting a change in the quadrature component Q, a mass or the like of the object placed on the seat 101, such as the weight of the occupant 120, can be detected. In this case, when the insulation sheet 27 is formed of a material easily performing elastic deformation, the detection precision of the weight or the like of the occupant 120 can be improved.

Moreover, according to the present embodiment, the AC voltages V1 and V2 applied by the AC power sources 34A and 34B have phases shifted by 180 degrees from each other. The present invention is not limited to this case, and the detection unit 33 can detect the occupant 120 seated on the seat 101 when the AC voltages V1 and V2 applied by the AC power source 34A and 34B have the same phase and amplitude.

In this case, the potential of the sensor electrode 25 and the potentials of the heater electrodes 21 and 22 become equal to each other. That is, the potentials at the points P1 to P4 in FIG. 12 become equal. In this case, no potential difference is caused between respective both terminals of the capacitors Cc and Cd, it becomes unnecessary to consider the presence of the heater electrodes 21 and 22 when detecting the occupant 120 through the sensor electrode 25. That is, the detection unit 33 can detect the occupant 120 without being affected by the heater electrodes 21 and 22.

In this case, also, the capacitances between the heater electrodes 21 and 22 and the vehicle 100 indicated by the capacitors Ca and Cb are undetected through the sensor electrode 25. That is, the capacitances between the heater electrodes 21 and 22 and the vehicle 100 are shielded by the heater electrodes 21 and 22. Hence, the detection unit 33 detects only the capacitances between the sensor electrode 25 and the occupant 120 indicated by the capacitors Ce and Cf and the capacitance between the occupant 120 and the vehicle 100 indicated by the capacitor C8. Accordingly, the detection unit 33 can precisely detect the occupant 120.

As explained above, according to the present embodiment, by changing the phases of the AC voltages V1 and V2 applied by the AC power sources 34A and 34B, the detection sensitivity of the occupant 120 by the sensor electrode 25 can be tuned. Moreover, it becomes possible to detect the occupant 120 precisely without being affected by the heater electrodes 21 and 22.

According to the present embodiment, the occupant 120 is detected based on the current i1 between the AC power source 34A and the sensor electrode 25. The present invention is not limited to this configuration, and the capacitances between the heater electrodes 21 and 22 and the vehicle 100 indicated as the capacitors Ca, Cb can be likewise detected by detecting, for example, current i2 between the AC power source 34B and the heater electrodes 21 and 22.

This capacitance increases when, for example, the occupant 120 sits down the seat 101, the seat deforms, and the distance between the heater electrodes 21 and 22 and the vehicle 100 and the distance between the heater electrodes 21 and 22 and the component provided in the vehicle 100 or the like is reduced. Hence, by detecting a change in the capacitance between the heater electrodes 21 and 22 and the vehicle 100, the weight or the like of the occupant 120 seated on the seat 101 can be detected. In this case, the sensor electrode 25 serves as a shield against the heater electrodes 21, 22. Hence, it becomes possible to detect the weight or the like of the occupant 120 seated on the seat 101 through the heater electrodes 21 and 22 without being affected by the capacitance between the occupant 120 and the sensor electrode 25.

As explained above, by detecting the current i2, the spatial dimension of the occupant 120 seated on the seat 101 and that of the object placed on the seat 101 can be detected through the sensor electrode 25, and the weight of the occupant 120 seated on the seat 101 and that of the object placed on the seat 101 can be detected through the heater electrodes 21 and 22.

When the heater electrodes 21 and 22 are utilized as a shield, it is desirable that the heater electrodes 21 and 22 should have an area equal to or larger than that of the sensor electrode 25, and the respective electrodes should overlap with each other. When the sensor electrode 25 is utilized as a shield, it is desirable that the sensor electrode 25 should have an area equal to or larger than the heater electrodes 21 and 22, and the respective electrodes should overlap with each other. In this case, when the respective electrodes are in the same shape, the shielding effect is maximized.

Moreover, only either one of the heater electrodes 21 and 22 can be utilized as a shield. Furthermore, when the seat heater 20 has heater electrodes of equal to or greater than a triple system, some heater electrodes may be utilized as a shield.

According to the present embodiment, the explanation was given of the case in which the phase of the voltage applied by the AC power source 34A and the phase of the voltage applied by the AC power source 34B have a difference (phase difference) that is 180 degrees from each other, but it is unnecessary that the phase difference between both voltages is always 180 degrees.

The embodiments of the present invention were explained above, but the present invention is not limited to the above-explained embodiments. For example, according to the present embodiment, as is clear from FIG. 3 and FIG. 4, the sensor electrode 25 is disposed at a location near the occupant 120, while the heater electrodes 21 and 22 are disposed at locations distant from the occupant 120. The present invention is not limited to this configuration, and the heater electrodes 21 and 22 may be disposed at locations near the occupant 120, while the sensor electrode 25 may be disposed at a location distant from the occupant 120. In this case, it becomes possible to warm the occupant 120 efficiently.

The quadrature demodulator 33b and the detector 33c may be connected to either one of the AC power sources 34A and 34B. Moreover, the quadrature demodulator 33b and the detector 33c may be connected to both of the AC power sources 34A and 34B, and the values of respective output voltages of the AC power sources 34A and 34B and the phases thereof may be changed to obtain the values of the in-phase component I and the quadrature component Q.

According to the above-explained embodiments, the explanation was given of the case in which the heater electrodes 21, 22 of the seat heater 20 and the sensor electrode 25 are formed on respective separate insulation sheets. The present invention is not limited to this case, and the heater electrodes 21, 22 and the sensor electrode 25 may be formed on the same insulation sheet. This simplifies the structure of the seat heater 20.

Figure 13:
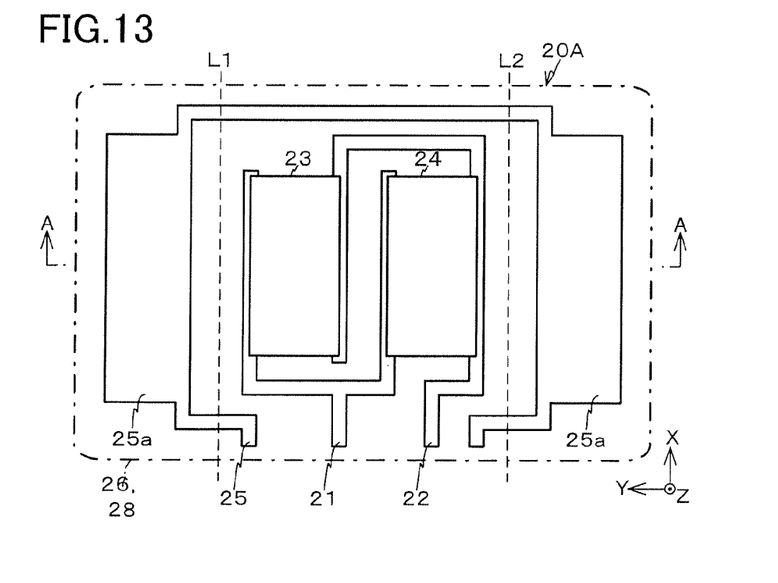
FIG. 13 is a plan view of a seat heater according to a modified embodiment.

FIG. 13 is a plan view illustrating a seat heater 20A according to a modified embodiment. As shown in FIG. 13, the seat heater 20A has the heater electrodes 21, 22, the heating elements 23, 24, and the sensor electrode 25 formed between the insulation sheets 26 and 28 bonded with each other.

The sensor electrode 25 has sensor portions 25a shaped into a rectangle with a lengthwise direction being directed in the X-axis direction and patterned in such a manner as to be disposed at both ends of the heater electrodes 21, 22 and the heating elements 23, 24.

Figure 14:
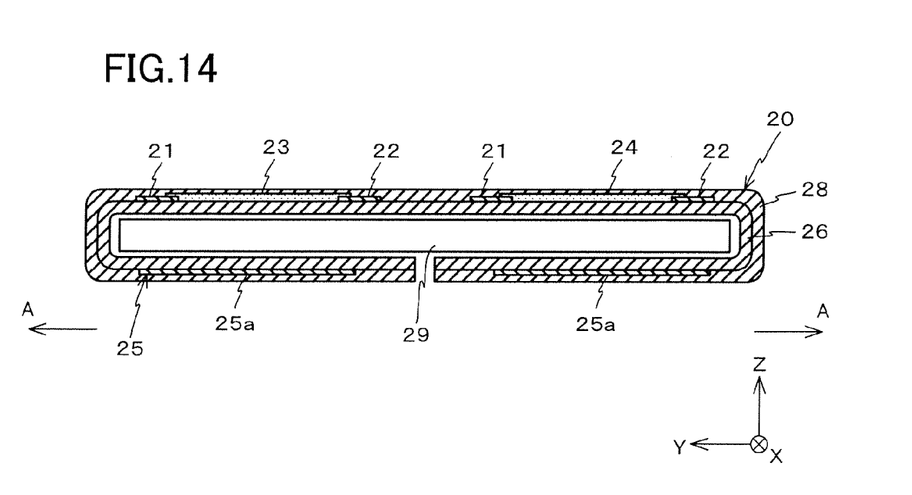
FIG. 14 is a cross-sectional view at a line A-A of the seat heater in FIG. 13.

When the insulation sheets 26, 28 covering the heater electrodes 21, 22, the heating elements 23, 24 and the sensor electrode 25 from the top-face side (+Z side) and the bottom-face side (−Z side) are folded along a dotted lines L1 and L2 indicated in FIG. 13, the seat heater 20 can be shaped as shown in FIG. 14. According to the seat heater 20 shown in FIG. 14, the heater electrodes 21, 22 and the heating elements 23, 24 are disposed at the top-face side, while the sensor portions 25a of the sensor electrode 25 are disposed at the bottom-face side.

The seat heater 20A including the heater electrodes 21, 22, the heating elements 23, 24, and the sensor electrode 25 of the modified example can be also used as the seat heaters of the above-explained first and second embodiments. According to this seat heater 20A, the heater electrodes 21, 22, the heating elements 23, 24, and the sensor electrode 25 can be formed in an integral manner, the production costs can be reduced.

Moreover, as shown in FIG. 14, a spacer 29 may be disposed between the heater electrodes 21, 22, the heating elements 23, 24 and the sensor electrode 25. According to such a structure, by adjusting the thickness of the spacer 29, the tuning or the like of the capacitance between the heater electrodes 21 and 22 and the sensor electrode 25 is facilitated.

Furthermore, the seat heater 20A may be used in such a way that the sensor electrode 25 is located at the top-face side, while the heater electrodes 21 and 22 are located at the bottom-face side.

According to the above-explained embodiments, information on the determination result by the detection unit 33 is output to the external device. The present invention is not limited to this configuration, and the information on the determination result by the detection unit 33 may be output to the heater unit 32. This allows the heater unit 32 to stop energizing the heater electrodes 21 and 22 when, for example, no occupant 120 is seated on the seat 101. This suppresses unnecessary power consumption.

Moreover, the heater unit 32 may obtain information on the in-phase component I from the detection unit 33, and may determine that the seat 101 is moistened when the in-phase component I exceeds a threshold to continue energizing the heater electrodes 21 and 22. According to such a configuration, the drying of the seat 101 can be prompted, thereby improving the detection precision of the occupant 120 seated on the seat 101.

A temperature measuring resistor PT for detecting the temperature of the seat 101 may be formed on the top face of the insulation sheet 26 or the insulation sheet 27. This allows the detection unit 33 to detect the temperature of the seat 101 from the resistance of the temperature measuring resistor PT, and to correct the threshold for determining whether or not the occupant 120 is seated on the seat 101 in consideration of the detected temperature.

The temperature of the seat 101 may be detected based on the resistance of the heating elements 23, 24 obtained through the heater electrodes 21, 22, and the threshold for determining whether or not the occupant 120 is seated on the seat 101 may be corrected in consideration of the detected temperature.

The detection unit according to the above-explained embodiments may be configured by hardware resources, or may be a computer or a microcomputer configured by a CPU (Central Processing Unit), a main memory, and an auxiliary memory.

According to the above-explained embodiments, the explanation was given of the case in which the seat heater 20 is installed in the seat 101 of the vehicle 100. The present invention is not limited to this case, and the seat heater 20 may be installed in the vehicle 100 other than the seat 101.

Various embodiments and modifications are available to the present invention without departing from the broad sense of spirit and scope of the present invention. The above-described embodiments are given for explaining the present invention and do not confine the scope of the present invention. In other words, the scope of the present invention is set forth by the scope of claims, not by the embodiments. Various modifications made within the scope of claims and scope of significance of the invention equivalent thereto are considered to fall under the scope of the present invention.

The heating system of the present invention is suitable for warming the occupant and for detecting the occupant.

The invention claimed is:

1. A heating system for warming an occupant seated on a seat of a vehicle, the heating system comprising:
   a heating element disposed in the seat;
   heater electrodes connected to the heating element;
   a sensor electrode disposed in the seat;
   a supply unit that supplies power to the heating element;
   a connection unit that intermittently connects the supply unit with the heater electrodes;
   a measurement unit that measures an impedance between the sensor electrode and the vehicle when the supply unit is not connected to the heater electrodes; and
   a detection unit that detects the occupant seated on the seat based on the impedance measured by the measurement unit;
   wherein the connection unit alternately connects the heater electrodes with the supply unit and a power source that applies a voltage to the heater electrodes.

2. The heating system according to claim 1, wherein the heater electrodes overlap the heating element or the heater electrodes.

3. The heating system according to claim 1, wherein the measurement unit measures, as an impedance correlation value, capacitance between the sensor electrode and the vehicle from an AC voltage applied between the sensor electrode and the vehicle and a current or a voltage input into the sensor electrode in accordance with a change in the impedance.

4. The heating system according to claim 3, wherein the measurement unit measures, as the capacitance that is the impedance correlation value, a quadrature component of the current to the AC voltage.

5. The heating system according to claim 4, wherein
   the measurement unit measures an in-phase component of the current to the AC voltage, and
   the detection unit detects the occupant seated on the seat based on a comparison result between a threshold defined based on a relationship between the in-phase component and the quadrature component and the capacitance.

6. The heating system according to claim 1, further comprising a temperature detecting sensor that detects a temperature of the seat near the heating element,
   wherein the detection unit detects the occupant based on a temperature of the seat detected by the temperature detecting sensor and a comparison result between the threshold and the capacitance.

7. The heating system according to claim 1, wherein the power source applies a voltage with a same phase as a phase of a voltage applied to the sensor electrode.

8. The heating system according to claim 1, wherein the power source applies a voltage with a different phase from a phase of a voltage applied to the sensor electrode.

9. The heating system according to claim 2, wherein the measurement means unit measures, as an impedance correlation value, capacitance between the sensor electrode and the vehicle from an AC voltage applied between the sensor electrode and the vehicle and a current or a voltage input into the sensor electrode in accordance with a change in the impedance.

10. The heating system according to claim 9, wherein the measurement unit measures, as the capacitance that is the impedance correlation value, a quadrature component of the current to the AC voltage.

11. The heating system according to claim 10, wherein
    the measurement unit measures an in-phase component of the current to the AC voltage, and
    the detection unit detects the occupant seated on the seat based on a comparison result between a threshold defined based on a relationship between the in-phase component and the quadrature component and the capacitance.

* * * * *